(No Model.) 2 Sheets—Sheet 1.

W. H. LINDSAY.
CLUTCH.

No. 502,732. Patented Aug. 8, 1893.

Fig. 3ª

Witnesses:
B. W. Miller
C. F. Sensner.

Inventor:
William H. Lindsay
By his Attorneys
Baldwin Davidson & Wight (No Model.) 2 Sheets—Sheet 2.

W. H. LINDSAY.
CLUTCH.

No. 502,732. Patented Aug. 8, 1893.

Witnesses.
B. W. Miller
G. F. Sensner

Inventor.
William H. Lindsay,
By his Attorneys
Bremor Davidson Wight

UNITED STATES PATENT OFFICE.

WILLIAM HENRY LINDSAY, OF BRISTOL, ENGLAND.

CLUTCH.

SPECIFICATION forming part of Letters Patent No. 502,732, dated August 8, 1893.

Application filed April 18, 1893. Serial No. 470,856. (No model.)

*To all whom it may concern:*

Be it known that I, WILLIAM HENRY LINDSAY, manager, a subject of the Queen of Great Britain, residing at the Shaw Engineering Works, Ashton Gate, Bristol, England, have invented a certain new and useful Clutch, of which the following is a specification.

In order to be able to couple either a driving or a driven pulley to the shaft that carries it I mount upon the shaft a sleeve which can be slid endwise along the shaft but not turned around it while the wheel can turn freely around the shaft but not moved endwise. To the sleeve I secure a coned or dished disk of spring metal which is of such a diameter as just to fit loosely within the rim of the wheel. The concave side of the disk is placed toward the pulley and the disk is slit radially to allow of its being somewhat flattened out and thereby expanded. A lever is also provided for moving the sleeve along the shaft. When the sleeve is moved by the lever toward the pulley the outer edge of the disk comes against a small rim on the inside of the wheel and is thereby stopped. All further movement of the sleeve then tends to flatten the disk and cause its circumference to bear against the inner circumference of the rim of the wheel. Immediately that this takes place the wheel is securely locked to the sleeve and consequently to the shaft. In the case of existing pulleys where the inside of the rim is not of suitable form a supplementary rim is bolted to the spokes. Where considerable holding power is required the disk may be flanged around its outer edge and the flange be made to bear against the interior of the wheel. The flange may have slits formed in it to allow it to spring and adapt itself to the wheel. The flange also may be coned and be made to fit to a corresponding cone on the wheel.

Figure 1:
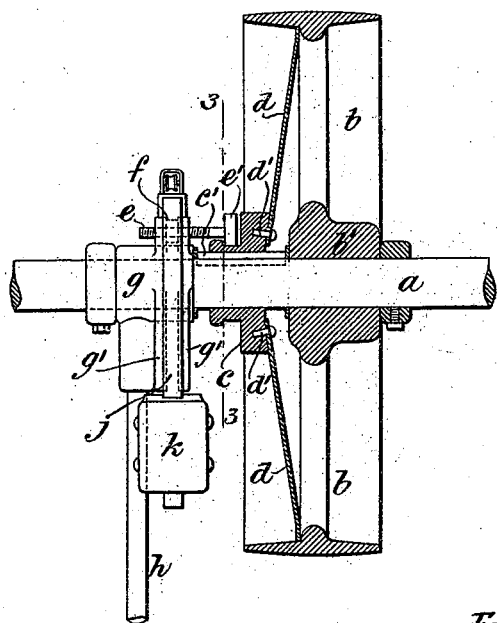
Figure 2:
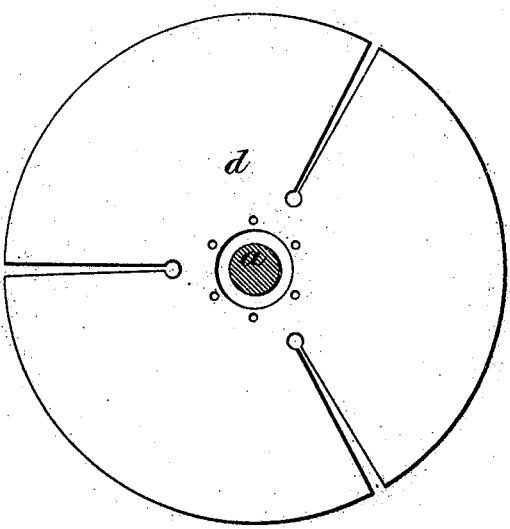
Figure 2:
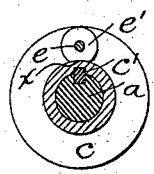
Figure 3:
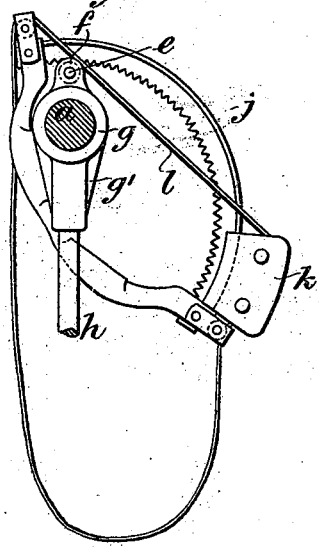
Figure 7:
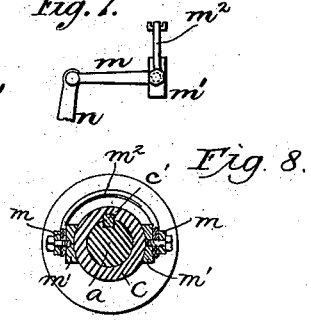
Figure 8:
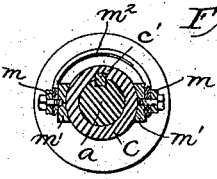

Figure 1 is a section partly in elevation of the clutch. Figs. 2 and 3 are elevations of the disk and connecting gear respectively. Fig. $3^a$ is a detail view, in section, on the line 3—3 of Fig. 1. Figs. 4 to 7 show a modification, Fig. 4 being a section partly in elevation of the clutch and Figs. 5 and 6 elevations of the disk and connecting gear respectively. Fig. 7 shows a detail. Fig. 8 is a detail view, in section, on the line 8—8 of Fig. 4.

In the figures $a$ is the shaft and $b$ the pulley, whose boss $b'$ is free to turn on the shaft but cannot move endwise upon it.

$c$ is a sleeve free to move endwise on the shaft but caused to rotate with it by the feather $c'$.

$d$ is the disk connected by bolts $d'$ to the sleeve $c$.

The steel disk in Figs. 1 and 2 is shown slightly thickened at rim and split in three places, but the rim may be curled over to form a rounded friction surface or bent in any way, and the conical disk may be split in any number of places, or, to gain the end desired, the pliability of the metal used may be relied on without splitting the disk. The disk may be made round in the first place or formed so that when expanded it should be perfectly circular. Gaps may be cut out of the circumference of the disk and friction pieces of any material may be affixed at the circumference.

In Figs. 1 to 3 $e$ is a screw which is prevented from turning by reason of its head $e'$ having a curved notch $x$ in it fitting the curve of the groove in the sleeve $c$ (see Fig. $3^a$). The screw $e$ has upon it a nut $f$ lying between side bars $g'$ upon a tube or bearing $g$, which is prevented from turning by being fixed to one end of a rod $h$ whose other end is fixed to the floor, wall or other place. The nut $f$ has teeth on its outside gearing with a segmental rack $j$ hanging loosely upon it. Upon this rack there is a sliding weight $k$, which can be pulled from the bottom to the top of the rack by the cord $l$. When this is done the weight $k$ causes the top of the rack to descend, and in so doing it revolves the nut $f$ and moves screw $e$ longitudinally and so causes the sleeve $c$ and disk $d$ to approach or recede from the pulley $b$.

Figure 4:
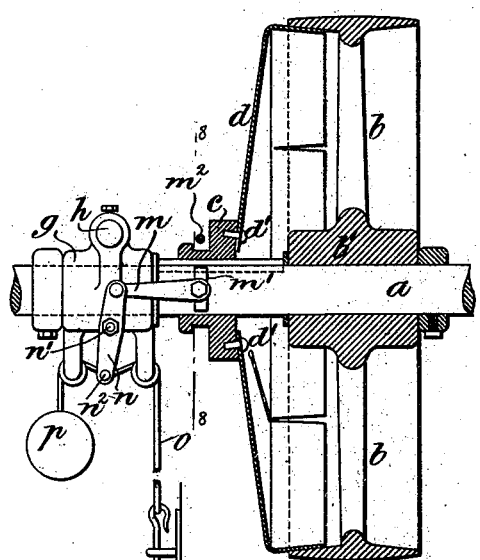
Figure 5:
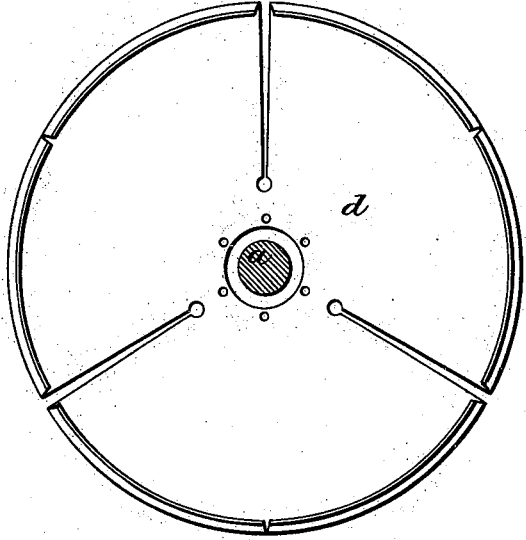
Figure 6:
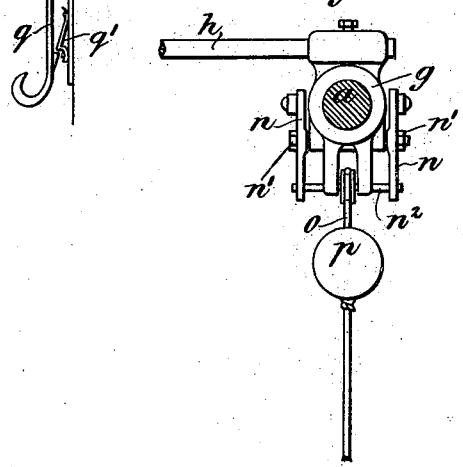

In Figs. 4 to 7 the sleeve $c$ is moved by a pair of connecting rods $m$ having at one end friction pieces $m'$ lying in the groove of the sleeve and connected by a wire $m^2$, as shown in Figs. 4 and 7. The other ends of the rods $m$ are pivoted to the upper ends of the levers $n$ pivoted at $n'$ to the tube or bearing $g$ upon the shaft. This tube or bearing is prevented from turning by being fixed to one end of the rod $h$, whose other end is fixed to the floor, wall or other place. The lower ends of the levers $n$ are connected together by the rod $n^2$ to which the cord $o$ is fixed. The cord $o$ is pulled in one direction by the weight $p$ and in the other by the handle or pull $q$ which is secured in its lower position by the spring catch q', (Fig. 4.)

What I claim is—

1. The combination of a shaft, a pulley free to turn on the shaft but prevented from moving endwise, a sleeve free to move endwise on the shaft but turning with it, a flexible dished disk fixed to the sleeve with its edge bearing against the inner surface of a rim on the pulley, a fixed tube or bearing in which the shaft works, and mechanism connecting the sleeve and the tube or bearing by which the former can be moved endwise on the shaft.

2. The combination of a shaft, a pulley free to turn on the shaft but prevented from moving endwise, a grooved sleeve free to move endwise on the shaft but turning with it, a flexible dished disk fixed to the sleeve with its edge bearing against the inner surface of a rim on the pulley, a fixed tube or bearing in which the shaft works, a screw with a circularly notched head lying in the groove of the sleeve, a nut carried by the tube or bearing and working on the screw, and means for turning the nut.

3. The combination of a shaft, a pulley free to turn on the shaft but prevented from moving endwise, a grooved sleeve free to move endwise on the shaft but turning with it, a flexible dished disk fixed to the sleeve with its edge bearing against the inner surface of a rim on the pulley, a fixed tube or bearing in which the shaft works, a plate in the groove of the sleeve, a rod having one end pivoted to the plate and the other end to a lever pivoted to the tube or bearing, and means for turning the lever about its pivot.

WILLIAM HENRY LINDSAY.

Witnesses:
A. H. ONSLOW,
*Notary Public, Bristol, England.*
H. J. MERCHANT,
*7 Blenheim Square, Marlboro Hill, Bristol, Solicitor's Clerk.*